United States Patent
Murata et al.

[11] Patent Number: 5,702,813
[45] Date of Patent: Dec. 30, 1997

[54] COMPOSITE MOLDED ARTICLE INCLUDING A POLARIZER OF POLYCARBONATE

[75] Inventors: Oritoshi Murata; Masahiko Okamoto, both of Higashi-Osaka, Japan

[73] Assignee: Yamamoto Kogaku Co., Ltd., Higashi-Osaki, Japan

[21] Appl. No.: 513,559

[22] Filed: Aug. 10, 1995

[30] Foreign Application Priority Data

Aug. 12, 1994 [JP] Japan ................... 6-190671

[51] Int. Cl.⁶ .................. B32B 5/16; B32B 27/36
[52] U.S. Cl. .......... 428/332; 428/412; 428/522; 428/913; 358/490; 358/350
[58] Field of Search ............... 428/332, 412, 428/522, 913; 359/490, 350

[56] References Cited

U.S. PATENT DOCUMENTS 5,051,309  9/1991  Takao ................. 428/332

FOREIGN PATENT DOCUMENTS

SHO53-40541  10/1978  Japan.

*Primary Examiner*—Leszek Kiliman
*Attorney, Agent, or Firm*—Oblon, Spivak, McClelland, Maier & Neustadt, P.C.

[57] ABSTRACT

A composite molded article including a polarizer of polycarbonate is provided which is excellent in impact resistance and allows for the manufacture of an eyesight-corrective polarizing lens for eyeglasses, and which comprises a protective layer 2 formed of an annealed or stretched polycarbonate material, a layer to be polished 4 including an untreated layer 6 formed of a polycarbonate material as injection-molded which is not annealed or stretched, and a polarizing film 3 which are superposed one on another in stack with the polarizing film 3 interposed between the protective layer 2 and the layer to be polished 4, the layer to be polished 4 being greater in thickness than the protective layer 2.

6 Claims, 6 Drawing Sheets

Prior Art

COMPOSITE MOLDED ARTICLE INCLUDING A POLARIZER OF POLYCARBONATE

BACKGROUND OF THE INVENTION

1. Field of the Invention

The present invention relates to a composite molded article including a polarizer of polycarbonate.

2. Related Art

As shown in FIG. 9, a conventional polarizing lens or polarizing sheet includes a pair of substrates 31 and 31 bonded together with an intervening polarizing film 33 therebetween. With this type of polarizing lens or polarizing sheet, it is a general practice to relax the internal stress thereof by annealing the substrates 31 and 32 where the substrates 31 and 32 are formed of glass, or by stretching the substrates 31 and 32 where the substrates 31 and 32 are formed of a plastic material.

Alternatively, a typical polarizing lens formed of CR-39 or a thermosetting resin as shown in FIG. 10 is formed by annealing CR-39 in a manner such that a polarizing sheet having substrates 31 and 32 of triacetate is subjected to hot bending and then introduced into a casting mold of glass so as to be cured and integrated in a relatively long time.

Where a polarizing lens or polarizing sheet includes substrates 31 and 32 formed of polycarbonate, those of the construction shown in FIG. 9 are now commercially available.

Such polycarbonate polarizing lenses or sheets now commercially available, however, have a thickness T of 1.5 mm at the largest. Although polycarbonate is excellent in impact resistance, sports now requiring keen movements, particularly outdoor sports require sport players to wear glasses having polycarbonate polarizing lenses of a thickness greater than the commercially available polycarbonate lenses.

Further, for outdoor sports players wearing glasses there is no polycarbonate polarizing lens for eyesight correction and, hence, supplemental lenses are frequently attached to glasses in use on the front side thereof. This results in a problem of cumbersomeness or like problems.

It is, therefore, an object of the present invention to provide a composite molded article including a polarizer of polycarbonate which is excellent in impact resistance and which allows for the manufacture of a eyesight-corrective polarizing lens for eyeglasses without combining with another pair of eyeglasses.

SUMMARY OF THE INVENTION

According to one aspect of the present invention, there is provided a composite molded article comprising a protective layer formed of an annealed or stretched polycarbonate material, an untreated layer formed of a polycarbonate material which is not annealed or stretched, and a polarizing film interposed between the protective layer and the untreated layer.

The untreated layer may be greater in thickness than the protective layer.

According to another aspect of the present invention, there is provided a composite molded article comprising a protective layer formed of an annealed or stretched polycarbonate material, a layer to be polished including an untreated layer formed of a polycarbonate material as injection-molded which is not annealed or stretched, and a polarizing film which are superposed one on another in stack with the polarizing film interposed between the protective layer and the layer to be polished, the layer to be polished being greater in thickness than the protective layer.

The layer to be polished may include an annealed or stretched layer on the side contacting the polarizing film.

These and other objects, features and attendant advantages of the present invention will become apparent from the following detailed description.

DETAILED DESCRIPTION OF THE PREFERRED EMBODIMENTS

The present invention will now be described in detail with reference to the attached drawings.

Figure 1:
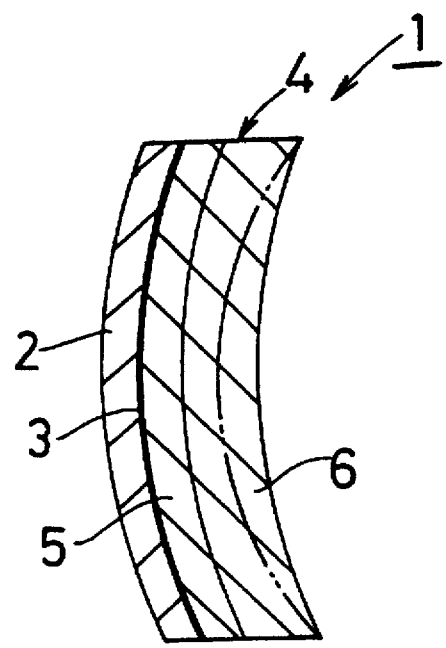
FIG. 1 is a sectional view of one embodiment of the present invention.

Referring to FIG. 1, a composite molded article 1 including a polarizer of polycarbonate comprises a protective layer 2, a polarizing film 3 and a layer to be polished 4 which are superposed one on another in stack.

The protective layer 2 is formed of an annealed or stretched polycarbonate material. The layer to be polished 4 includes a treated layer 5 and a untreated layer 6, the treated layer 5 being formed of an annealed or stretched polycarbonate material like the protective layer 2, and the untreated layer 6 being formed of a polycarbonate material as injection-molded which is not annealed or stretched. The untreated layer 6 is bonded to the concave side of the treated layer 5 with an adhesive. The thickness of the layer to be polished 4 is greater than that of the protective layer 2 by the thickness of the untreated layer 6. The thickness of the protective layer 2 is equal to that of the treated layer 5, and the total thickness of the two layers is about 1.5 mm.

The polarizing film 3 is interposed between the protective layer 2 and the layer to be polished 4 and bonded to each of the layers. Thus, the protective layer 2 and the layer to be polished 4 are superposed on the other with the polarizing film 3 intervening therebetween.

The constitution of the above composite molded article 1 is characterized in that the protective layer 2 is formed of the annealed or stretched polycarbonate material, that the layer to be polished 4 includes the untreated layer 5, and that the layer to be polished 4 is made thicker than the protective layer 2. The reason why such constitution is adopted is as follows.

Figure 5:
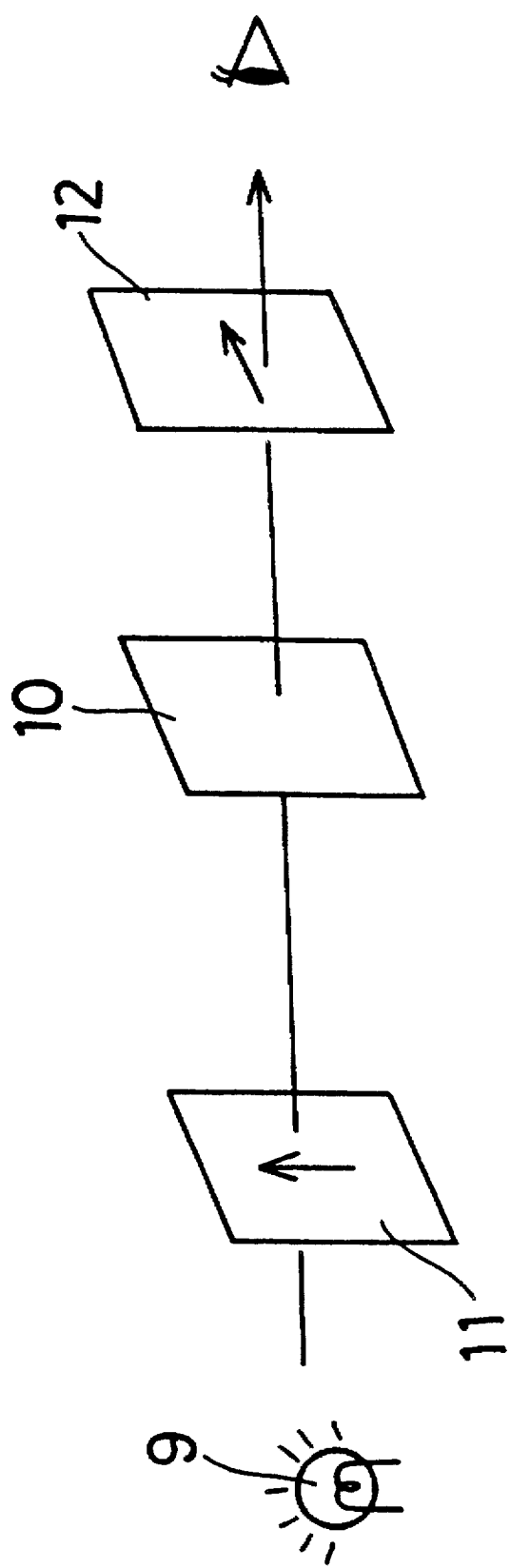
FIG. 5 is a schematic illustration for explaining the operation of an embodiment of the present invention.
Figure 6:
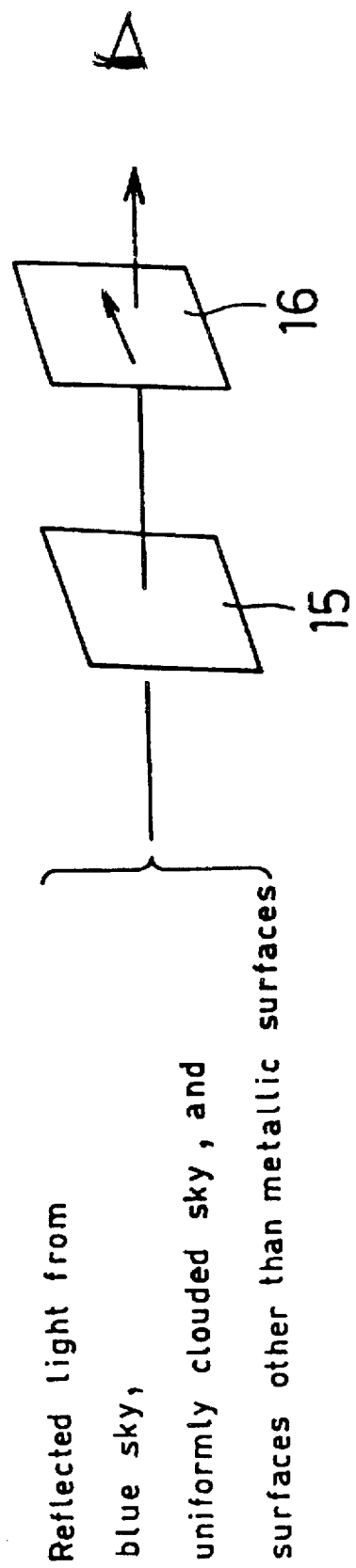
FIG. 6 is a schematic illustration for explaining the operation of an embodiment of the present invention.

FIG. 5 is a schematic illustration for explaining the method employed in visualizing the internal stress of an object. As shown, a polarizing article 11, for example, polarizing sheet is located between a light source 9 and a subject for observation 10, and a polarizing article 12 is disposed between the subject 10 and the observer so that the polarization axis thereof is perpendicular to that of the polarizing article 11. When the subject 10 is viewed from the polarizing article 12, the internal stress of the subject 10 is visualized. This method is employed in photoelasticity tests.

When a substrate 15 with strain is disposed ahead of a polarizing sheet 16 and is viewed through the polarizing sheet 16, light containing polarizing components reflected from blue sky, uniformly clouded sky or surfaces other than metallic surfaces visualizes the internal stress of the substrate 15 to thereby interfere with the visibility of the observer as in the above method while at the same time causing color voids (or partial discoloration) of the polarizing sheet.

The composite molded article 1 has been accomplished by taking notice of the above phenomenon. The protective layer 2 on one side (or front side) of the polarizing film 2 is formed of an annealed or stretched polycarbonate material to prevent the visualization of internal stress thereof thereby avoiding the interference with the visibility of the viewer and the occurrence of discoloration. Further, the layer to be polished 4 on the other side (or rear side) of the polarizing film 3 is made to have a thickness greater than that of the protective layer 2 to provide a sufficient thickness to be polished. This constitution of the composite molded article provides the following advantages:

1. excellent impact resistance since the thickness of a lens is made greater than conventional;
2. possibility of polishing over a wide area of the lens depending on eyesight;
3. good visibility; and
4. less costly manufacture by virtue of not annealed or stretched layer on the concave side of the lens, and no problems caused by annealing or stretching.

Figure 2:
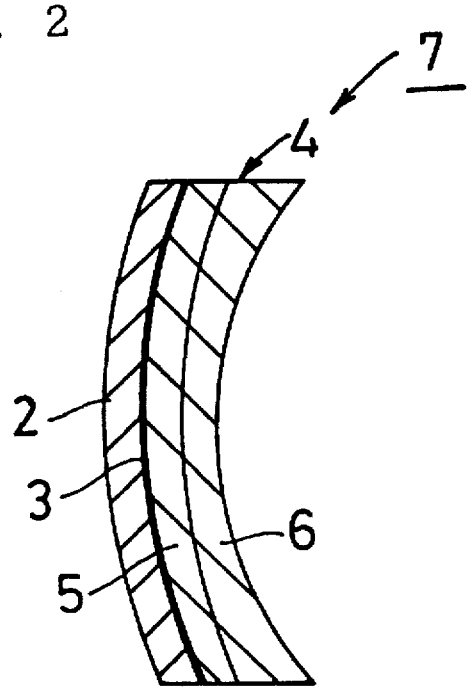
FIG. 2 is a sectional view of a polarizing lens for eyeglasses manufactured from a composite molded article according to the embodiment shown in FIG. 1.
Figure 3:
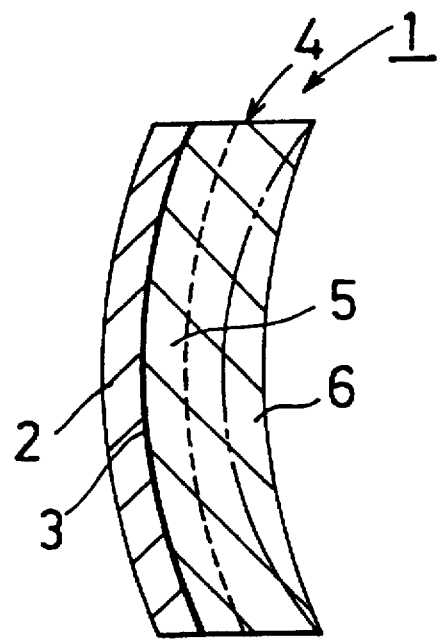
FIG. 3 is a sectional view of another embodiment of the present invention.

To manufacture a polarizing lens for eyeglasses from the composite molded article 1, the concave side of the layer to be polished 4 is polished up to the broken line in FIG. 3 thereby providing a polarizing lens 7 for eyeglasses shown in FIG. 2 with ease.

Figure 4:
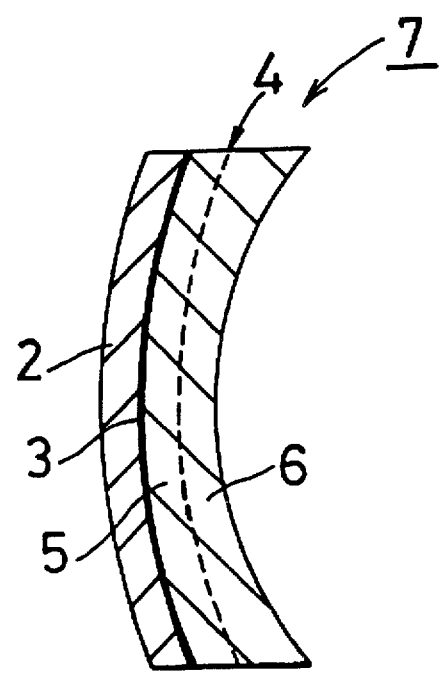
FIG. 4 is a sectional view of a polarizing lens for eyeglasses manufactured from a composite molded article according to the embodiment shown in FIG. 3.

FIG. 3 shows another embodiment of the invention in which a layer to be polished 4 includes a treated layer 5 and an untreated layer 6 which is not treated for internal stress relaxation and is formed integrally with the treated layer on the concave side thereof by injection molding. Other features of this embodiment are the same as the foregoing embodiment. In this case too, the concave side of the layer to be polished 4 is polished up to the broken line in FIG. 3 to provide a polarizing lens 7 for eyeglasses shown in FIG. 4 with ease.

Figure 7:
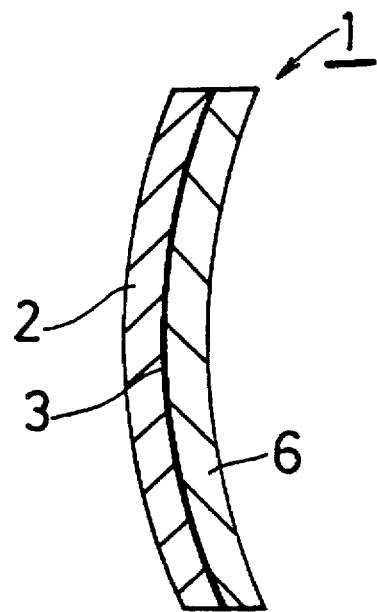
FIG. 7 is a sectional view of yet another embodiment of the present invention.

FIG. 7 shows yet another embodiment of the invention in which the treated layer 5 of the layer to be polished 4 in the above embodiment is omitted. Thus, the composite molded article shown comprises a protective layer 2 formed of an annealed or stretched polycarbonate material, an untreated layer 6, and a polarizing film 3, which are superposed one on another in stack with the polarizing film 3 interposed between the protective layer 2 and the untreated layer 6.

Figure 8:
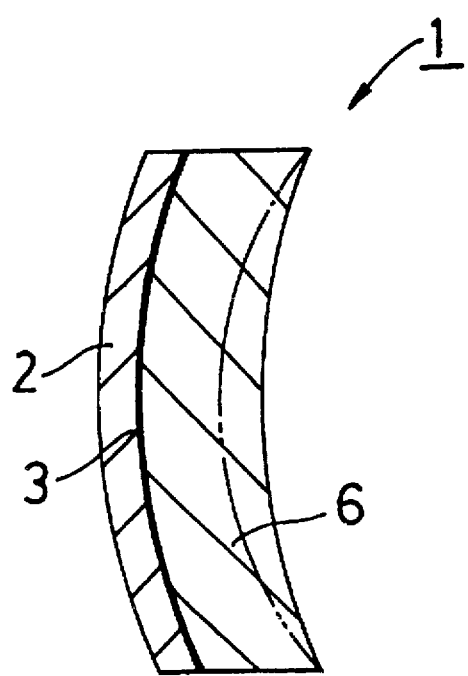
FIG. 8 is a sectional view of still another embodiment of the present invention.
Figure 9:
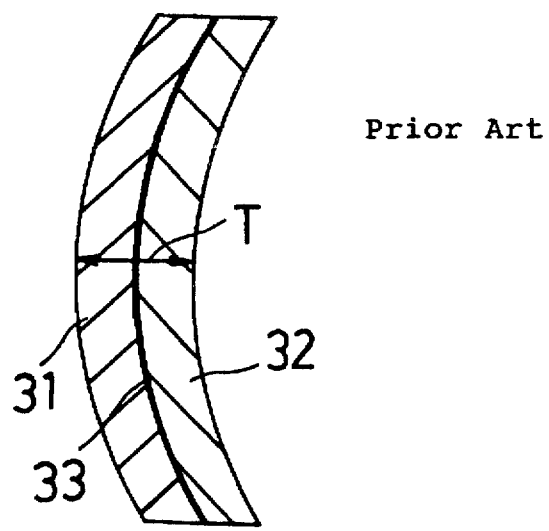
FIG. 9 is a sectional view of a conventional molded article.
Figure 10:
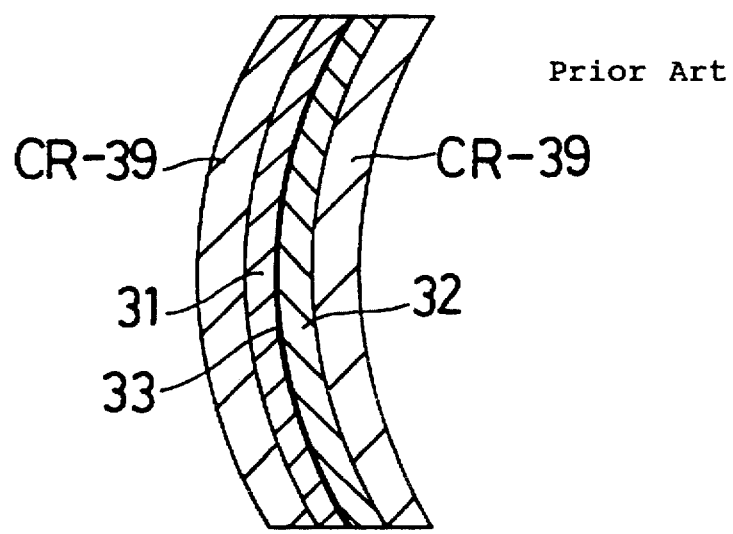
FIG. 10 is a sectional view of another conventional molded article.

FIG. 8 shows a variation of the embodiment shown in FIG. 7 in which the untreated layer 6 is made thicker than the protective layer 2. The concave side of the composite molded article 1 shown in FIG. 8 is polished up to the broken line in FIG. 8 to provide a polarizing lens for eyeglasses with ease.

As has been described, a composite molded article according to the present invention comprises protective layer 2 formed of an annealed or stretched polycarbonate material, untreated layer 6 formed of a polycarbonate material which is not annealed or stretched, and polarizing film 3 interposed between the protective layer 2 and the untreated layer 6. This constitution allows the untreated layer to be formed thicker than the protective layer 2 thereby ensuring increased strength and impact resistance, hence enhanced safety of the article. Further, the composite molded article of this constitution makes it possible to manufacture an eyesight-corrective polarizing lens for eyeglasses without combining with another pair of eyeglasses.

Alternatively, a composite molded article according to the present invention comprises protective layer 2 formed of an annealed or stretched polycarbonate material, layer to be polished 4 including untreated layer 6 formed of a polycarbonate material as injection-molded which is not annealed or stretched, and polarizing film 3 which are superposed one on another in stack with the polarizing film 3 interposed between the protective layer 2 and the layer to be polished 4, the layer to be polished 4 being made thicker than the protective layer 2. This constitution allows polishing over a wide area depending on the eyesight of the user and ensures good visibility. In addition, the concave side of the article is not annealed or stretched, resulting in less costly manufacture of the article and in no problem caused by annealing or stretching. Thus, the composite molded article of this constitution makes it possible to manufacture an eyesight-corrective polarizing lens of enhanced impact resistance for eyeglasses without combining with another pair of eyeglasses.

While only certain presently preferred embodiments of the invention have been described in detail, as will be apparent with those familiar with the art, certain changes and modifications can be made in embodiments without departing from the spirit and scope of the invention as defined in the following claims.

What is claimed is:

1. A composite molded article, comprising a protective layer formed of an annealed or stretched polycarbonate material, a second layer formed of a polycarbonate material which is neither annealed nor stretched, and a polarizing film interposed between the protective layer and the second layer, the second layer being greater in thickness than the protective layer so that the polarizing film is positioned closer to the protective layer side than the center of the thickness of the composite molded article.

2. The composite molded article of claim 1, which is concave and having said annealed or stretched polycarbonate material on a concave side thereof.

3. A composite molded article of claim 2, wherein the layer including the second layer includes an annealed or stretched layer on the side contacting the polarizing film.

4. A composite molded article, comprising a protective layer formed of an annealed or stretched polycarbonate material, a layer including a second layer formed of a polycarbonate material which is neither annealed nor stretched, and a polarizing film interposed between the protective layer and the layer including a second layer, the layer including the second layer being greater in thickness than the protective layer so that the polarizing film is positioned closer to the protective layer side than the center of the thickness of the composite molded article.

5. The composite molded article of claim 4, which is concave and having said annealed or stretched polycarbonate material on a concave side thereof.

6. An eyesight-corrective polarizing lens having improved impact resistance without requiring combination with another eyeglass, which comprises the composite molded article of any one of claims 1, 4 or 3.

* * * * *